Figure 1:
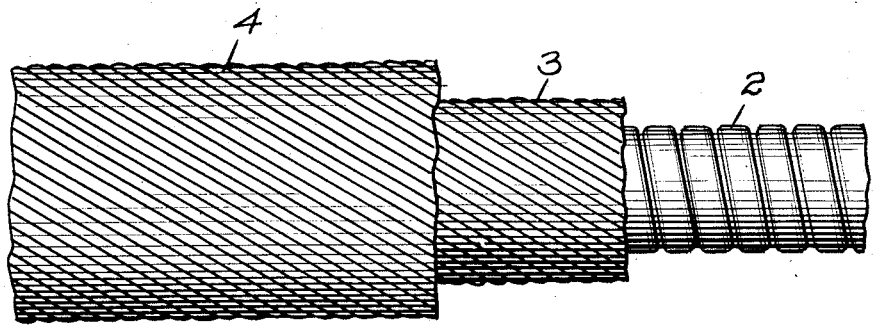

April 8, 1924.  
T. VARNEY  
ELECTRICAL CONDUCTOR CABLE  
Filed July 2, 1920

1,489,402

WITNESSES  
INVENTOR  
Theodore Varney

Patented Apr. 8, 1924.

1,489,402

UNITED STATES PATENT OFFICE.

THEODORE VARNEY, OF SEWICKLEY, PENNSYLVANIA, ASSIGNOR TO ALUMINUM COMPANY OF AMERICA, OF PITTSBURGH, PENNSYLVANIA, A CORPORATION OF PENNSYLVANIA.

ELECTRICAL CONDUCTOR CABLE.

Application filed July 2, 1920. Serial No. 393,503.

*To all whom it may concern:*

Be it known that I, THEODORE VARNEY, a citizen of the United States, residing at Sewickley, in the county of Allegheny and State of Pennsylvania, have invented certain new and useful Improvements in Electrical Conductor Cables, of which the following is a specification.

My invention relates to electrical conductors, and more particularly to a flexible electrical conductor cable designed for the transmission of electrical power by means of very high voltages.

Commercial high tension transmission cables have heretofore generally consisted of copper strands, aluminum strands, or a combination of high strength steel strands with aluminum, and while such cables have proven satisfactory under certain conditions of service as regards the corona, in cases where the lines do not employ, for example, over one hundred and twenty-five thousand volts, they are not capable of carrying, without considerable loss, higher voltages.

It has been found by experience and research (as is well known to those familiar with the art) that when a voltage exceeds a certain critical value for a conductor of a certain diameter, the air in the vicinity of the wire commences to break down and electricity leaks from the cable into the surrounding air, thereby producing a loss of power. This is known as corona loss. When a certain transmission line, therefore, has reached its limit of carrying capacity, it would be possible to carry more power over that line if the voltage of the line could be increased. This cannot be done, however, beyond a certain critical value without increasing the diameter of the cable.

In order to prevent corona loss, it is not necessary to increase the cross section of the conducting material, but it is necessary to increase the overall diameter of the cable. Furthermore, this increase of diameter should, if possible, not be attended by an increase of weight, because the limit of the strength of the towers, insulators, and fittings which support the cable would have to be correspondingly increased if the weight of the cable were increased.

For commercial purpose, it is necessary that the cable should possess a degree of flexibility sufficient to enable it to be wound upon reels or drums, the size of the drums, of course, depending upon the size and weight of the cable. For instance, a cable embodying my invention may have an outside diameter of two inches or more, and a cable of this size would preferably have to be capable of bending in a circle having a radius of about twelve inches.

The prime object of my invention is to provide a new and improved electrical conductor possessing the required strength and flexibility and capable of effective use in high tension transmission lines employing very high voltages.

Figure 2:
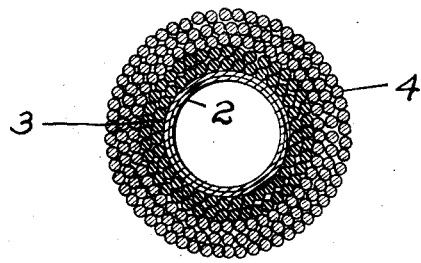

In the accompanying drawings, which illustrate applications of my invention,

Fig. 1 is a side elevational view of a portion of a flexible electrical conductor cable embodying my invention;

Fig. 2, a cross sectional view of the form of Fig. 1; and

Figure 3:
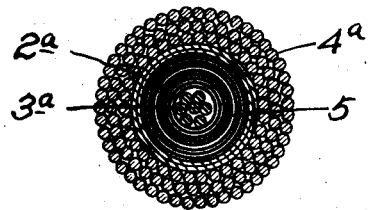
Figure 4:
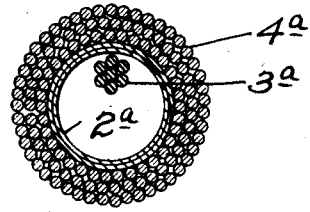
Figure 5:
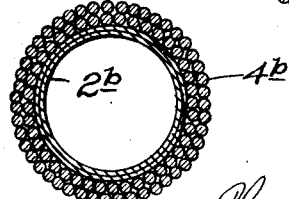

Figs. 3, 4 and 5, cross sectional views of modified forms of my invention.

Referring to the drawings, and first to the form of Fig. 1, 2 designates a flexible tube or tubing preferably formed of a suitable metal, for example, galvanized steel, aluminum, or other metals; or, if preferred, the tubing may be non-metallic. The tubing employed should be of such a character as to give resistance to transverse crushing, and should have sufficient longitudinal strength to enable the tubing to pass through stranding machinery and to withstand the usual amount of handling during the process of installation. The principal function of the tubing is to provide an increased diameter to the conductor cable over that possible with an equal weight and longitudinal strength produced by a solid bundle of wires.

As illustrated in the form of Fig. 1, the flexible tubing is surrounded by a plurality of layers of wires or members 3; while the wires or members surrounding the tubing may be composed of any material having the desired qualities, I prefer to employ high strength galvanized steel for these longitudinally extending cable strengthening means, the function of the wires 3 being to provide the requisite longitudinal strength.

Surrounding the wires 3 I provide a plurality of layers of wires or members 4, composed of a material possessing high electrical conductivity; i. e., aluminum or copper, While I have shown two layers of strengthening wires and three layers of electrical conducting wires in the form of Fig. 1, it is obvious that I may employ a single layer of wire having a high tensile strength and a single layer of wire of good conductivity or that the wires designed for the purposes specified may be differently assembled, it being desired that an annular conducting casing preferably formed of contacting strands of naked wire be provided.

The forms of Figs. 3 and 4 show the arrangement of placing the longitudinal strengthening wires 3$^a$ within the flexible tubing 2$^a$ and the conducting wires 4$^a$ outside of the said tubing. The longitudinal wires in this case form a stranded cable in themselves and may or may not fill the interior of the tubing. In Fig. 3, the space between the interior walls of the flexible tube and the wires 3$^a$ is completely or partially filled with a fibrous braid 5, this braid being placed on the stranded wires or enclosed cable 3$^a$ prior to its being drawn into the tubing. In place of the braid 5, an insulating covering known commercially as "weatherproof" insulation could be employed. The wires or stranded cable 3$^a$ may be employed as in Fig. 4 without a covering or material between said cable and the interior walls of tubing 2$^a$. In each of the forms of Figs. 3 and 4, one or more layers of electrical conductive wires 4$^a$ are positioned on the outer surface of the tubing.

In the form of Fig. 5 I dispense with the strengthening wires and rely upon the longitudinal strength of the electrical conductor 4$^b$, the latter preferably including one or more layers of wires of high electrical conductivity surrounding the flexible tubing 2$^b$.

By means of the constructions herein shown and described, a cable of considerable overall diameter capable of efficiently taking care of corona loss in circuits having voltages as high as two hundred and fifty thousand, or even more, is provided.

It will be noted that the embodiments of my invention contemplate a cable having an overall cross sectional area considerably greater than the cross sectional area of the conductor per se, thus obviating the corona loss; further, by the employment of the flexible tubing, the weight of the cable is kept down to a minimum.

What I claim is:

1. An aerial conductor cable having a large over-all cross-sectional area relatively to its metallic area and including a flexible metal tubing, longitudinal strengthening wires whose combined cross sectional area is considerably less than the area of a circle whose diameter is that of the cable, and an annular outer surface of high electric conductivity.

2. An electrical conductor cable including a flexible supporting tubing inherently capable of resisting relatively high transverse pressures, longitudinal strengthening means, and an annular outer surface of high electrical conductivity embracing the tubing and strengthening means.

3. An electrical conductor cable including a flexible tubing inherently capable of resisting transverse pressures, and an annular outer series of contacting strands of high electrical conductivity embracing the flexible tubing, and longitudinal strengthening means enclosed within the conducting strands.

4. An electrical conductor cable including a flexible tubing inherently capable of resisting transverse pressures, longitudinal strengthening wires surrounding the tubing, and an annular series of contacting conducting wires of high electrical conductivity surrounding the first mentioned wires or strands and exposed to the atmosphere.

5. An electrical conductor cable including a flexible galvanized steel tubing, longitudinal strengthening wires wound around said tubing, and an outer annular series of contacting wires of high electrical conductivity wound upon the longitudinal strengthening wires.

6. An aerial conductor cable for high tension currents comprising a stranded conductor having enclosed within it a hollow core and longitudinal strengthening wires of high tensile strength, the cross sectional area of the metal in the cable being considerably less than the area of a circle whose diameter is the over-all diameter of the cable.

7. An aerial electric conductor cable for high tension currents including a flexible tubing inherently capable of withstanding relatively high transverse pressures and adapted to be bent to a relatively sharp curvature without deformation thereof, longitudinal strengthening wires, and annular means surrounding the outside of the tubing and outside of the strengthening wires having a high electrical conductivity.

8. An aerial electric conductor cable having a small over-all cross sectional area of metal relatively to the diameter of the conductor, and including an outer annular conductor of electricity, the conductivity of which is high, a relatively thin light tubing within the conductor capable of resisting transverse pressures and inherently capable of supporting the conductor, and longitudinally extending means having a high tensile strength enclosed within the conductor, the cross sectional area of the conductor strengthening means and tubing being considerably less than the area of a circle, the diameter of which is the over-all diameter of the cable.

9. An aerial electric cable for high tension currents comprising an outer casing of high electric conductivity, longitudinally extending strengthening means having a high tensile strength enclosed within the casing, and a flexible tubing within the conductor inherently capable of holding the conductor from being collapsed, this construction enabling the conductor to have a relatively large diameter with a minimum cross sectional area of metal, the cross sectional area of the conductor strengthening means and tubing being considerably less than the area of a circle whose diameter is that of the cable.

10. An aerial cable for high tension currents comprising an annular stranded conductor of a high electric conductivity having a relatively large diameter with a relatively small cross sectional area of metal, longitudinally extending strengthening means having a high tensile strength within the conductor, and a relatively thin flexible metal tubing serving as a support for the conductor and preventing it from collapsing and which is inherently capable of resisting relatively high transverse pressures.

11. An aerial conductor for high tension currents comprising an annular stranded conductor having a high electric conductivity, longitudinal strengthening means of high tensile strength enclosed therewithin, and spirally wound flexible tubing for supporting the conductor and preventing it from collapsing.

12. An aerial cable for high tension currents comprising a flexible tubing formed of spirally wound substantially flat thin sheet metal and inherently capable of withstanding relatively high transverse pressures, and a stranded conductor surrounding the tubing and supported thereon.

In testimony whereof I affix my signature in presence of two witnesses.

THEODORE VARNEY.

Witnesses:
J. M. GEOGHEGAN,
LOIS WINEMAN.